United States Patent
Henderson et al.

(10) Patent No.: US 11,512,618 B2
(45) Date of Patent: Nov. 29, 2022

(54) ENHANCED SOOT OXIDATION ON PARTICULATE FILTER USING CERIA-BASED CATALYST AND ZONE COATING STRATEGY

(71) Applicant: Southwest Research Institute, San Antonio, TX (US)

(72) Inventors: Robert Henderson, San Antonio, TX (US); Nicholas Kaylor, San Antonio, TX (US); Grant Seuser, San Antonio, TX (US); Cary Henry, Helotes, TX (US)

(73) Assignee: Southwest Research Institute, San Antonio, TX (US)

( * ) Notice: Subject to any disclaimer, the term of this patent is extended or adjusted under 35 U.S.C. 154(b) by 28 days.

(21) Appl. No.: 17/163,352

(22) Filed: Jan. 30, 2021

(65) Prior Publication Data
US 2022/0243625 A1    Aug. 4, 2022

(51) Int. Cl.
*F01N 3/021* (2006.01)
*B01J 23/83* (2006.01)
*F01N 3/022* (2006.01)
*F01N 3/20* (2006.01)
*F01N 3/035* (2006.01)
*B01D 53/94* (2006.01)
*B01J 23/72* (2006.01)
*B01J 29/00* (2006.01)

(52) U.S. Cl.
CPC ........ *F01N 3/0211* (2013.01); *B01D 53/9468* (2013.01); *B01D 53/9472* (2013.01); *B01J 23/83* (2013.01); *F01N 3/022* (2013.01); *F01N 3/035* (2013.01); *F01N 3/2066* (2013.01); *B01D 2255/2065* (2013.01); *B01D 2255/20761* (2013.01); *B01D 2255/50* (2013.01); *B01D 2255/9155* (2013.01); *B01J 23/72* (2013.01); *B01J 29/00* (2013.01)

(58) Field of Classification Search
CPC ........... B01D 53/9468; B01D 53/9472; B01D 2255/2065; B01D 2255/20761; B01D 2255/50; B01D 2255/9155; B01J 23/83; B01J 23/72; B01J 29/00; F01N 3/022; F01N 3/035; F01N 3/2066
See application file for complete search history.

(56) References Cited

U.S. PATENT DOCUMENTS

| | | | |
|---|---|---|---|
| 2013/0149220 A1* | 6/2013 | Swallow | B01J 23/42 502/74 |
| 2014/0093442 A1* | 4/2014 | Spreitzer | B01D 53/9472 422/171 |
| 2017/0362984 A1* | 12/2017 | Li | B01J 35/04 |

* cited by examiner

Primary Examiner — Audrey B. Walter
(74) Attorney, Agent, or Firm — Livingston Law Firm

(57) ABSTRACT

An improved SCRoF (selective catalytic reduction on filter) device for treating exhaust from an internal combustion engine. The filter has numerous entry and exit channels. Exhaust enters the entry channels and flows through side walls into the exit channels. Relative to the exhaust flow path, these side walls are coated on the downstream side with a ceria-based catalyst and on the upstream side with a Cu-zeolite catalyst. This allows the filter to optimally achieve both particulate matter oxidation and NOx reduction, respectively.

6 Claims, 3 Drawing Sheets

ENHANCED SOOT OXIDATION ON PARTICULATE FILTER USING CERIA-BASED CATALYST AND ZONE COATING STRATEGY

TECHNICAL FIELD OF THE INVENTION

This invention relates to automotive exhaust aftertreatment devices, and more particularly to particulate filters and selective catalytic reduction catalysts.

BACKGROUND OF THE INVENTION

One conventional approach to reducing particulate matter (PM) and nitrogen oxides (NOx) from diesel engine exhaust is to use two separate systems, the diesel particulate filter (DPF) and the selective catalytic reduction (SCR) catalyst.

A DPF is a wall-flow substrate, having substrate walls through which exhaust flows. The PM (soot) is collected within the filter and the exhaust gas is filtered. Once the soot has been collected, it is oxidized to CO2 using O2 or NO2 as an oxidant. Adding a catalyst to the DPF lowers the PM oxidation temperature during regeneration of the DPF by oxidizing NO to NO2. The newly available NO2 is a powerful oxidant that converts PM to CO2 at lower temperatures than is possible with only O2. Platinum group metals (PGMs) are typically used as the catalyst and this combination of DPF and catalyst is known as a catalyzed soot filter (CSF).

An SCR functions by using injected ammonia (NH3) to reduce NOx. It must remain separately housed from a CSF because the CSF's PGM oxidizes NH3 thereby reducing the NH3 available for the SCR process.

A more recent approach to reducing NOx and PM from diesel engine exhaust is to integrate CSF and SCR functions in one component by placing the active mass of the SCR catalyst on the filter substrate of the CSF. This integrated catalyst is referred to as SCR on Filter (SCRoF). An SCRoF typically uses a Cu-zeolite catalyst to reduce NOx by reacting it with NH3. The SCRoF is increasing in popularity of use, not only because of a reduction in total catalyst volume, but also because the SCR catalyst is closer to the engine for improved cold start NOx reduction. A disadvantage of existing SCRoFs is that the independent functionality of the catalysts is hindered.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to an improved SCRoF that uses a special ceria-based catalyst for PM treatment and optimizes their placement within the filter substrate. The SCRoF provides enhanced soot oxidation at lower temperatures to reduce fuel-consuming active regeneration events.

Catalyst selection for PM treatment is based on oxygen storage capacity, such as ceria-zirconia mixed metal oxides. Several additives in addition to zirconia are added to ceria to improve its storage capacity and oxidation capability. In particular, NO oxidation to NO2 is desired. On the other hand, NH3 oxidation is undesired.

A feature of the invention is the recognition that traditional oxidation catalysts based on platinum group metals are unsatisfactory for an SCRoF device. These catalysts oxidize NH3 at a high rate in addition to oxidizing NOx.

Figure 1:
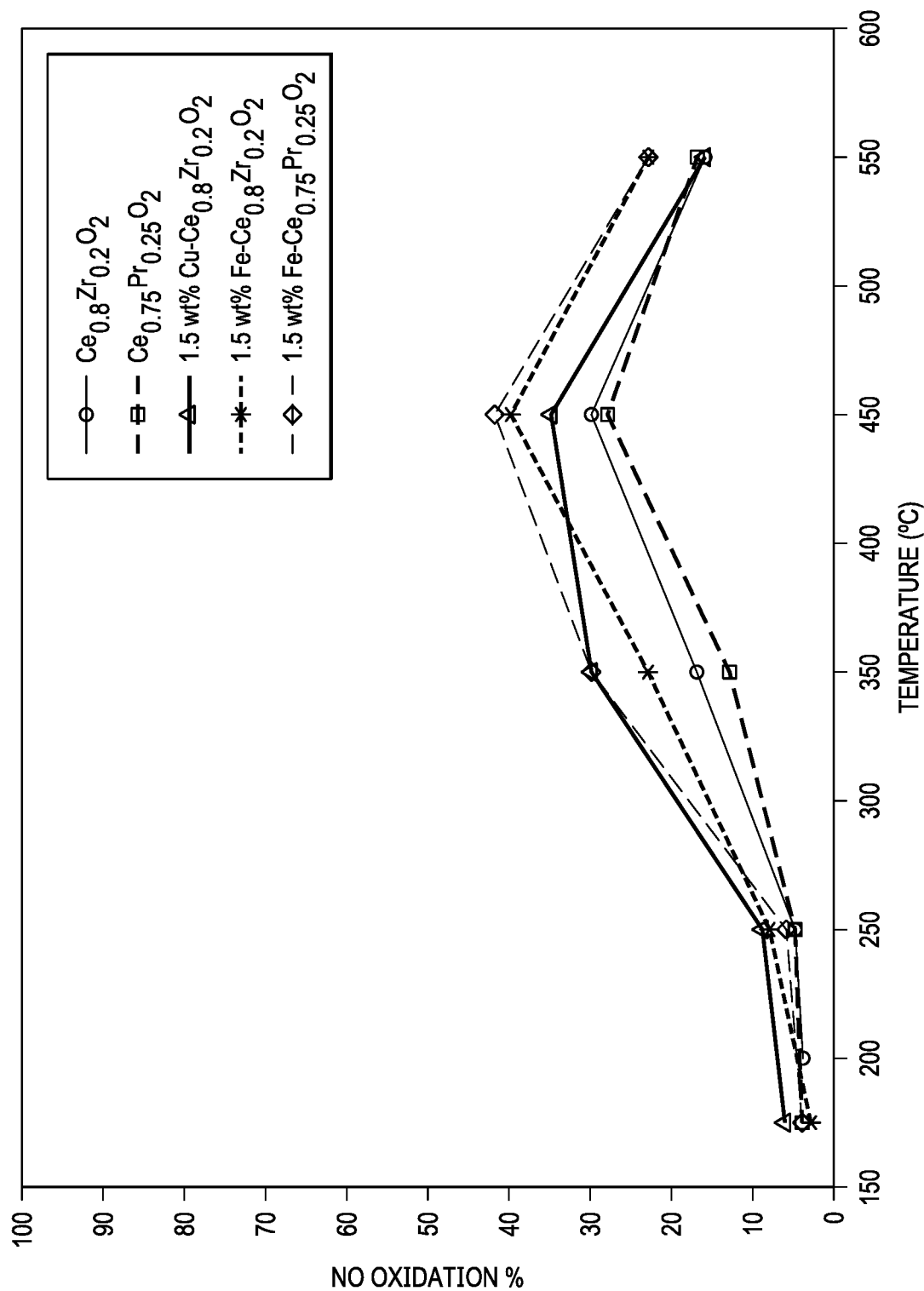
FIG. 1 illustrates NOx oxidation by various ceria-based mixed metal oxide catalysts.

FIG. 1 illustrates NO oxidation data for doped ceria-based mixed metal oxides, including Fe-doped and Cu-doped catalysts. As illustrated, Fe-doped CeZr and CePr catalysts provide reasonable NO oxidation activity at 350 degrees C. and 450 degrees C., converting approximately 30% and 40% at each temperature, respectively.

As stated above, in addition to providing high NO oxidation, the catalyst for the SCRoF of this invention was selected to display a low propensity toward NH3 oxidation under standard operating conditions.

Figure 2:
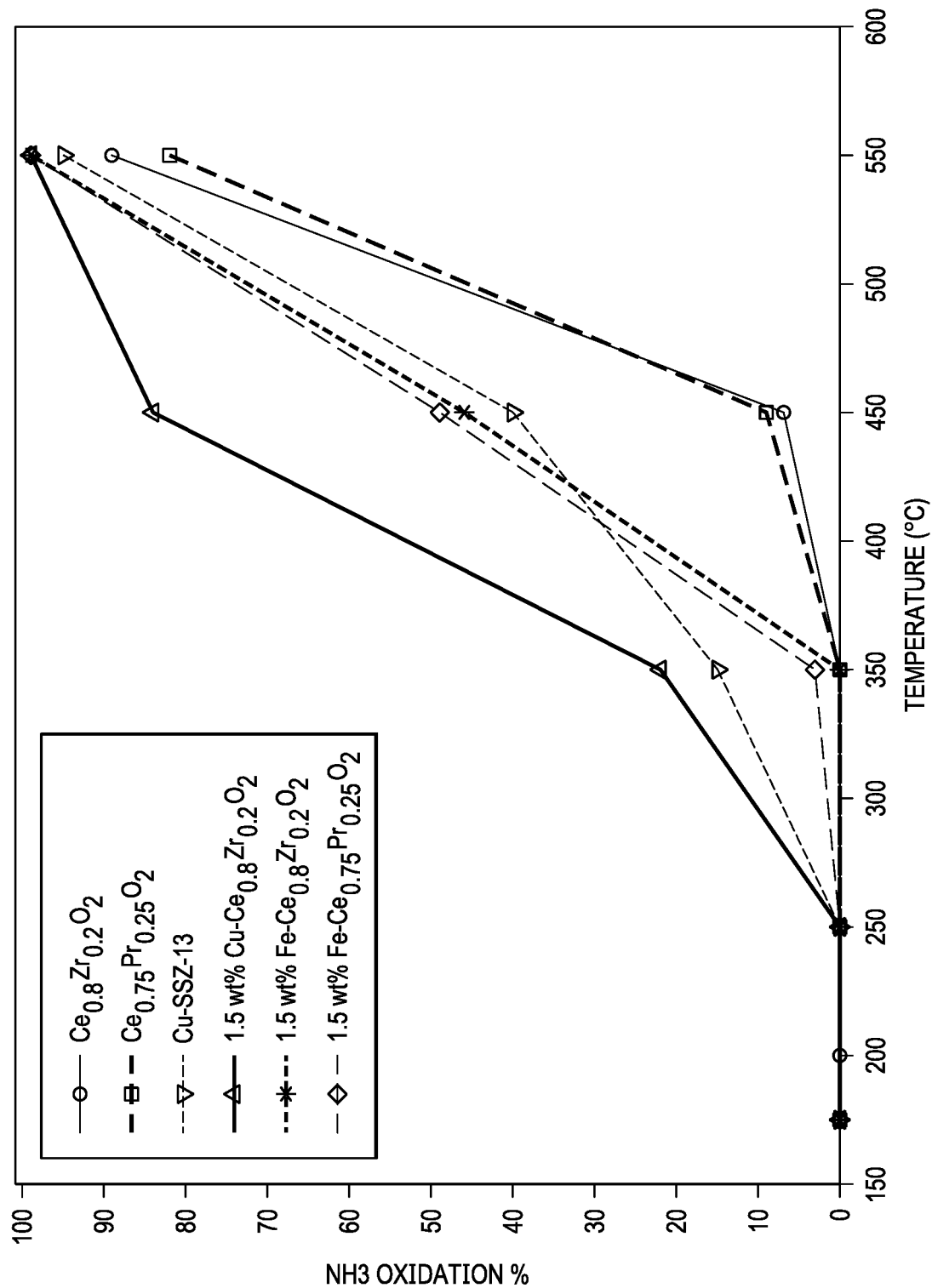
FIG. 2 illustrates NH3 oxidation by various catalysts.

FIG. 2 illustrates NH3 oxidation by various catalysts. A conventional SCR Cu-SSZ-13 catalyst is used as a reference. Fe-doped catalysts exhibited comparable NH3 oxidation behavior compared to the reference at 550 degrees C. and 450 degrees C. Fe-doped CeZr and CePr catalysts display less NH3 oxidation at 350 degrees C., oxidizing less than 5% NH3 versus 15% observed over the Cu-SSZ-13 standard.

A low NH3 oxidation activity coupled with high NO oxidation makes the $Fe-Ce_{0.8}Zr_{0.2}$ and $Fe-Ce_{0.75}Pr_{0.25}$ excellent catalysts choices for an SCRoF. The metal ratios set out here are examples—a wide range of ratios is possible for achieving the stated goals of low NH3 oxidation and high NO oxidation.

Figure 3:
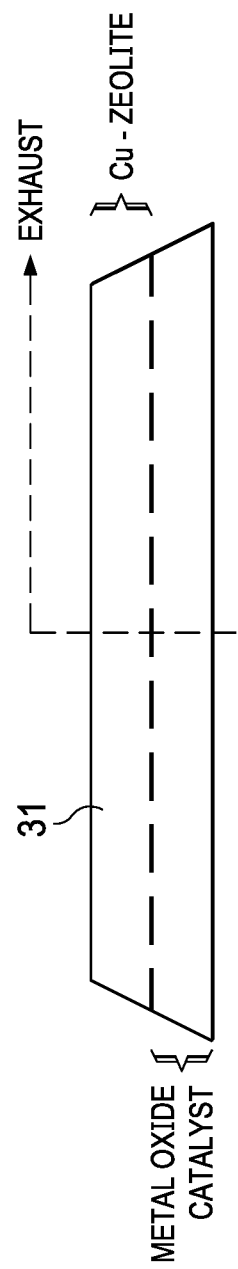
FIG. 3 illustrates a filter side wall having zoned catalyst coatings in accordance with the invention.

FIG. 3 illustrates a "zone coating" strategy for an SCRoF in accordance with the invention. A portion of the filter wall 31 is illustrated. The direction of exhaust flow from one side of the filter wall to the other is indicated by the arrow.

The PM and NH3 compete for use of NO2. To maximize the PM oxidation rate, the Cu-zeolite catalyst coating is downstream of the metal oxide catalyst coating. This allows the PM to react with the incoming and created NO2 first, before the Cu-zeolite begins to reduce NOx.

In other words, the "inner side" of the filter wall 31 is coated with a ceria-based catalyst, such as those described above and selected according to the above criteria. This catalyst could be ceria alone or a ceria mixed with at least one other metal.

The "outer side" of the filter wall 32 is coated with a Cu-zeolite catalyst. The relative amounts of catalysts, metal oxide versus Cu-zeolite, depends on catalytic activity, soot production rate, and tail-pipe NOx demands.

A stark division between the two layers is not necessary. During the catalyst coating process, catalyst material will diffuse through the wall. A substantial intermediate zone in which the two catalysts are mixed is expected to be an optimal coating strategy for most applications. The amount of diffusion through the filter layer 31 for one side or the other can be varied and controlled during the coating process.

Figure 4:
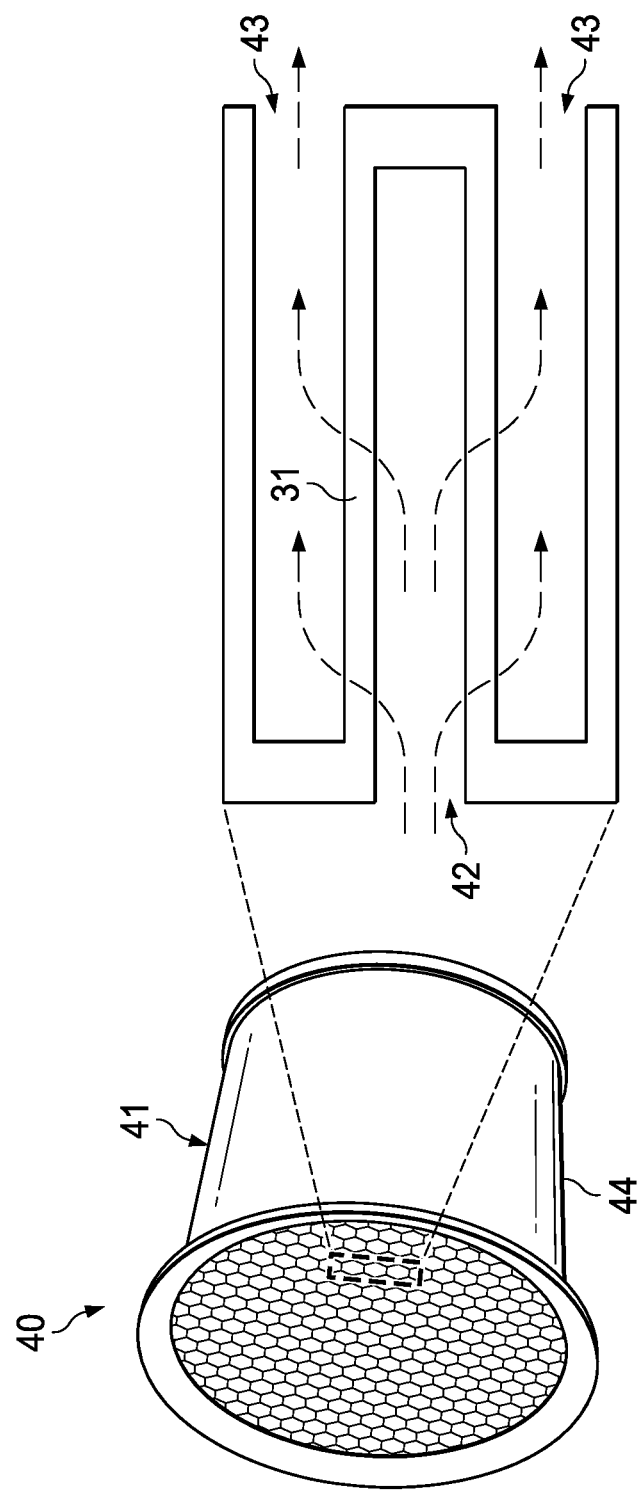
FIG. 4 illustrates an SCRoF having the zoned catalyst filter side walls of FIG. 3.

FIG. 4 illustrates an example of an SCRoF filter 40 in accordance with the invention, as well as detail of one of its inlet channels 42 and two outlet channels 43. Filter 41 has hundreds of such channels, with inlet channels 41 alternating with outlet channels 43 contained within a housing 44. Exhaust enters the inlet channels 41, and as the exhaust exits the inlet channels 41 into the outlet channels 43, soot collects on the inner walls of the inlet channels. The exhaust then exits the filter 40 via the outlet channels 43.

Each inlet channel 42 has side walls 31 and an end wall at the outlet end of the filter 40. The side walls 31 have an "inner" and outer" surface, each surface coated with a different catalyst as described above. The different catalysts perform the PM oxidation and SCR NOx reduction functions.

In sum, the SCRoF filter described herein seeks to enhance exhaust aftertreatment performance by adding Fe-$Ce_{0.8}Zr_{0.2}$ and Fe-$Ce_{0.75}Pr_{0.25}$ or these metals in different ratios, to produce NO2 without oxidizing NH3. The added metal oxides increase PM oxidation. This reduces the rate of fuel consumed by regeneration events without interfering with NOx reduction by the SCR catalyst.

The zone coating strategy directs a larger portion of the produced NO2 to low-temperature soot oxidation instead of to reaction with NH3 by the SCR catalyst.

What is claimed is:

1. A method of treating exhaust from an internal combustion engine, comprising:
   selecting a soot catalyst by selecting a number of ceria-based candidate catalysts, testing each candidate catalyst over a range of temperatures for its NO (nitrogen oxide) oxidation capabilities, testing each candidate catalyst over a range of temperatures for its NH3 (ammonia) oxidation capabilities, and selecting the soot catalyst on the basis of maximizing NO oxidation and minimizing NH3 oxidation at a selected temperature range;
   providing a filter housing having an inlet end for receiving the exhaust and an outlet end from which the exhaust exits;
   providing a filter substrate comprising numerous channels running from the inlet end to the outlet end, with alternating channels being entry channels having a closed end at the outlet end of the housing or exit channels having a closed end at the inlet end of the housing;
   providing each entry channel having filter side walls, such that exhaust enters the channel at the inlet end and exits the channel through the filter side walls;
   wherein the filter side walls have an inner surface and an outer surface relative to the entry channel, the inner surface being coated with the soot catalyst and the outer surface being coated with a Cu-zeolite catalyst; and
   delivering the exhaust into the entry channels such that the exhaust is filtered through the soot catalyst before being filtered through the Cu-zeolite catalyst.

2. The method of claim 1, wherein both surfaces are coated such that the ceria-based catalyst or the Cu-zeolite catalyst diffuse into the filter side wall.

3. The method of claim 1, wherein both surfaces are coated such that the ceria-based catalyst or the Cu-zeolite catalyst diffuse into the filter side wall and mix together within the filter wall.

4. The method of claim 1, wherein the ceria-based catalyst is ceria mixed with at least one other metal.

5. The method of claim 1, wherein the ceria-based catalyst is Fe-doped.

6. The method of claim 1, wherein the ceria-based catalyst is Fe-doped CeZr or Fe-doped CePr.

* * * * *